(12) United States Patent
Saul et al.

(10) Patent No.: US 6,290,388 B1
(45) Date of Patent: Sep. 18, 2001

(54) MULTI-PURPOSE INTEGRATED INTENSIVE VARIABLE SENSOR

(75) Inventors: Cyro K. Saul, Centro Curitiba (BR); Jay N. Zemel, Jenkintown, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 09/263,145

(22) Filed: Mar. 5, 1999

Related U.S. Application Data

(60) Provisional application No. 60/077,086, filed on Mar. 6, 1998.

(51) Int. Cl.$^7$ ............... G01N 25/18; G01N 7/01; H01L 31/068; G01F 1/68
(52) U.S. Cl. ............... 374/44; 374/1; 374/164; 374/165; 374/178; 257/467; 257/470; 73/25.03; 73/204.26
(58) Field of Search ............ 374/178, 164, 374/165, 163, 44, 43, 1; 257/470, 467; 73/204.26, 204.25, 204.24, 25.03

(56) References Cited

U.S. PATENT DOCUMENTS

| | | | |
|---|---|---|---|
| 3,851,528 | * | 12/1974 | Nichols et al. ............... 374/178 |
| 4,133,208 | * | 1/1979 | Parlanti ............... 374/178 |
| 4,204,429 | * | 5/1980 | Shimazaki et al. ............... 374/164 |
| 4,472,239 | * | 9/1984 | Johnson et al. ............... 257/467 |
| 4,478,077 | * | 10/1984 | Bohrer et al. ............... 73/204.26 |
| 4,685,331 | * | 8/1987 | Renken et al. ............... 73/204.26 |
| 4,696,188 | * | 9/1987 | Higashi ............... 257/467 |
| 4,744,246 | * | 5/1988 | Busta ............... 73/204.26 |
| 4,832,504 | * | 5/1989 | Hori et al. ............... 374/163 |
| 4,884,443 | * | 12/1989 | Lee et al. ............... 73/204.26 |
| 4,888,987 | * | 12/1989 | Zhang ............... 374/178 |
| 4,888,988 | * | 12/1989 | Lee et al. ............... 73/204.26 |
| 4,902,138 | * | 2/1990 | Goeldner et al. ............... 374/44 |
| 5,297,419 | * | 3/1994 | Richardson ............... 73/25.03 |
| 5,311,447 | * | 5/1994 | Bonne ............... 374/44 |
| 5,348,394 | * | 9/1994 | Hori et al. ............... 374/44 |
| 5,406,841 | * | 4/1995 | Kimura ............... 73/204.26 |
| 5,600,174 | * | 2/1997 | Reay et al. ............... 257/467 |
| 5,623,097 | * | 4/1997 | Horiguchi et al. ............... 73/204.15 |
| 5,644,068 | * | 7/1997 | Okamoto et al. ............... 73/25.03 |

OTHER PUBLICATIONS

Denlinger et al., "Thin Film Microcalorimeter for Heat Capacity Measurements from 1.5 to 800K," *Rev. Sci. Instr.*, Apr. 1994, 65(4), 946–959.

Gajda et al., "Applications of Thermal Silicon Sensors on Membranes," *Sensors Actuators–A*, 1995, 49, 1–9.

Klaassen et al., "Diode–Based Thermal RMS Converter with On–Chip Circuitry Fabricated Using CMOS Technology," *Sensors Actuators–A*, 1996, 52, 33–40.

Seidel et al., "Anisotropic Etching of Crystalline Silicon in Alkaline Solutions," *J. Electrochem. Soc.*, Nov. 1990, 137(11), 3612–3626.

Vossen et al., "Thin Film Processes," Academic Press, New York, 1978.

\* cited by examiner

*Primary Examiner*—Diego Gutierrez
*Assistant Examiner*—Stanley J. Pruchnic, Jr.
(74) *Attorney, Agent, or Firm*—Woodcock Washburn Kurtz Mackiewicz & Norris LLP

(57) ABSTRACT

An integrated environment temperature sensor device provides improved temperature sensitivity by using a diode as the sensing element. The integrated sensor device comprises a heater element for creating a fixed quantity of heat energy. The sensor device also comprises an integrated circuit diode which receives the fixed quantity of heat energy from the heater element. The integrated circuit diode has a constant forward bias current applied thereto and a change in environment temperature is reflected in a voltage change across the integrated circuit diode. The integrated circuit diode further comprises an electrically insulating layer positioned substantially between the heater element and the integrated circuit diode for electrically insulating the two from each other.

9 Claims, 13 Drawing Sheets

MULTI-PURPOSE INTEGRATED INTENSIVE VARIABLE SENSOR

CROSS-REFERENCE TO RELATED APPLICATIONS

This application is related by subject matter and claims priority to U.S. provisional application Ser. No. 60/077,086, filed Mar. 6, 1998 and entitled "MULTI-PURPOSE INTEGRATED INTENSIVE VARIABLE SENSOR", the contents of which are incorporated by reference in their entirety.

BACKGROUND OF THE INVENTION

1. Field of the Invention

The present invention relates generally to environment temperature sensing devices and more particularly to a micro-fabricated sensor with improved temperature sensitivity.

2. Description of the Prior Art

Micro-fabricated structures are finding a wider range of scientific and technological uses. One advantage of micro-fabricated devices is that many properties do not scale adversely with decreasing size. For example, as a structure decreases in size, the amount of energy required to raise the temperature scales linearly with volume. Thermal losses due to conduction, radiation, and convection vary with appropriate areas. Consequently, for fixed energy input, a larger temperature arises in a smaller structure. This property has a number of advantages for sensor applications. If temperature is the primary intensive thermodynamic variable used in the sensing process, the amount of energy required to modulate the temperature decreases with size.

Existing integrated temperature sensor devices for measuring changes in environment temperature typically employ resistors as temperature sensing elements. Several limitations have been noted, however, in resistor-based temperature sensing devices. For example, resistor-based integrated temperature sensing devices lack consistency in the temperature coefficient of resistance between batches of resistors. Furthermore, platinum and similar materials which are typically employed as the resistive element of such devices are expensive. Additionally, in resistor based integrated temperature devices, since the resistor is used both as a heater and as a thermometer, there is a direct change in the device's response when the applied power is modified.

Accordingly, there is a need in the art for an improved environment temperature sensing device. Specifically, there is a need for an integrated sensing device which overcomes the above listed limitations associated with resistor-based integrated sensing devices and which also provides improved temperature sensitivity.

SUMMARY OF THE INVENTION

Briefly, the present invention is directed toward remedying these shortcomings in an integrated device having a diode sensor for sensing temperature changes in the environment instead of a resistor-based sensor. A device in accordance with the present invention comprises a heater element for creating a fixed quantity of heat energy. The inventive device further comprises an integrated circuit diode which receives the fixed quantity of heat energy from the heater element and which receives a constant forward bias current applied thereto. A change in environment temperature is reflected in a voltage change across the circuit diode. The inventive device also comprises an electrically insulating layer positioned substantially between the heater element and the circuit diode to electrically insulate them from each other.

According to another aspect of the invention, there is provided a method of manufacturing the integrated sensor device of the invention. The method comprises the following steps: masking and doping a wafer to form an integrated diode with a first and a second polarities; applying an insulating layer over the diode; applying a heating element to the insulating layer opposite the diode; etching contact holes in the insulating layer corresponding to the first and second polarities; and applying contact pads to the contact holes.

BRIEF DESCRIPTION OF THE DRAWINGS

The foregoing and other novel features and advantages of the invention will become more apparent and more readily appreciated by those skilled in the art after consideration of the following description in conjunction with the associated drawings, of which.

DETAILED DESCRIPTION OF THE PRESENTLY PREFERRED EMBODIMENTS

From basic mathematical equations representing diode operations, it is straightforward to show that under constant current, I the voltage drop, V, across the p-n junction of a diode is:

$$V = \frac{n \cdot k_B \cdot T}{q} \cdot \ln\left(\frac{I}{A \cdot J_0(T)}\right) + \frac{n \cdot E_g}{2 \cdot q} \qquad (1)$$

where $J_0(T)$ is a weakly temperature (T) dependent parameter, A is the area of the p-n junction, $E_g$ is the energy band gap, $k_B$ is the Boltzmann constant, V is the applied voltage and n is a non-ideality parameter. According to this equation, when a diode's current is held constant, the diode's forward bias voltage provides a direct measure of absolute temperature. By contrast, as noted by Denlinger et al. in an article entitled "Thin Film Microcalorimeter for Heat Capacity Measurements from 1.5 to 800K," Review of Scientific Instruments, Vol. 65, No. 4, pp. 946–959 (1994), resistive sensors do not present a linear relation between the voltage measured and the absolute temperature. In addition, the forward biased voltage of a constant current diode responds to temperature with minimal interference with the energy content of the system. Furthermore, the energy dissipated in a diode decreases with the area of the p-n junction. These characteristics make a diode an ideal temperature monitor. As shown by E. H. Klaassen et al. in an article entitled "Diode-Based Thermal RMS Converter With On-Chip Circuitry Fabricated Using CMOS Technology," Sensors and Actuators-A, Vol. 52, pp. 33–40 (1996), temperature sensitivity coefficients of −2.0 mV/K have previously been obtained. The inventors have found that a device in accordance with the present invention using diode technology as the sensing device provides temperature sensitivity coefficients of approximately −2.5 mV/K, which is a 25% improvement. Accordingly, the present invention is directed to a micro-fabricated temperature sensor having a diode as the detection element instead of a resistor-based sensor.

Figure 1:
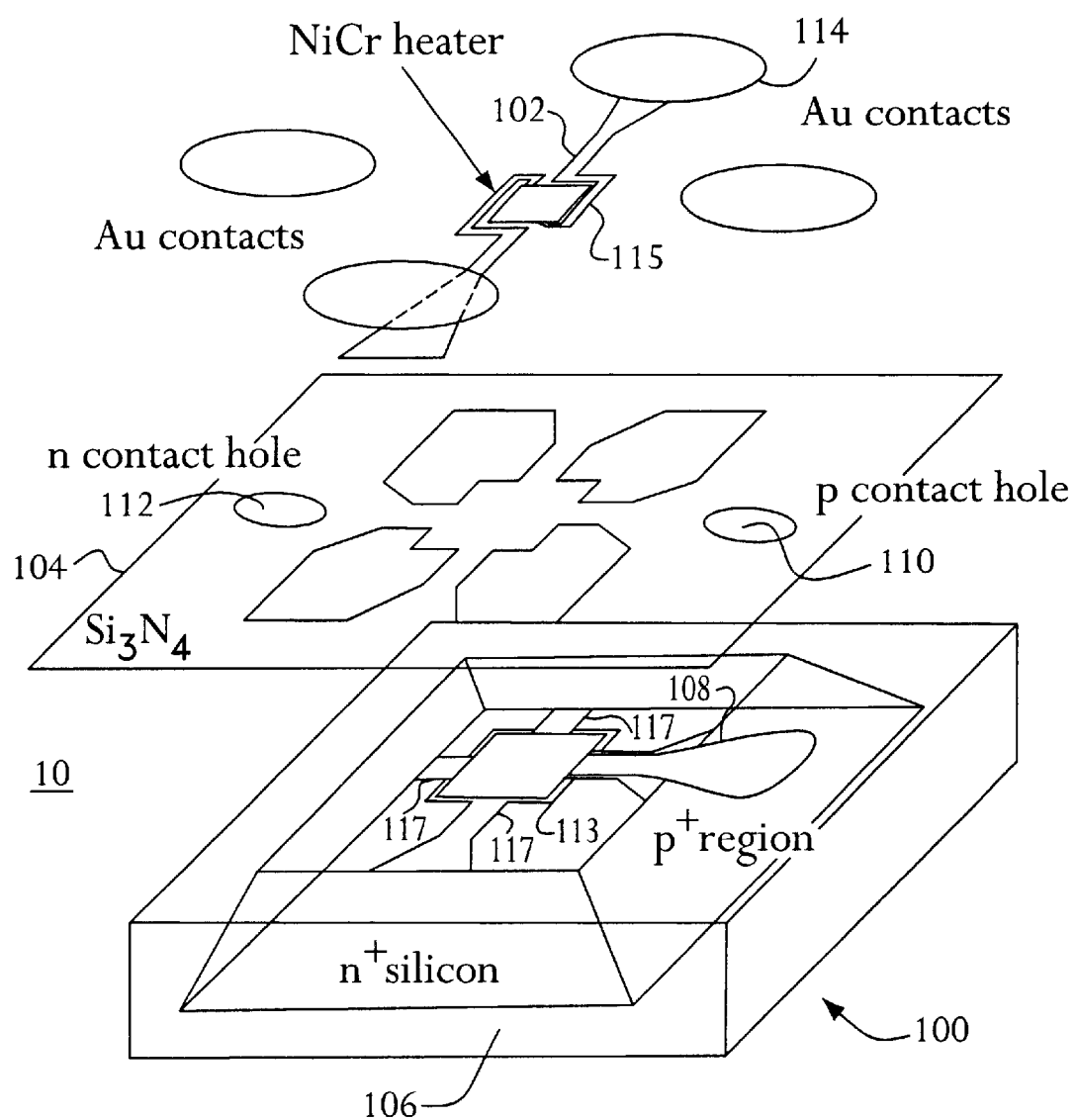
FIG. 1 is a schematic of an exploded view of a sensor device in accordance with the present invention.
Figure 2:
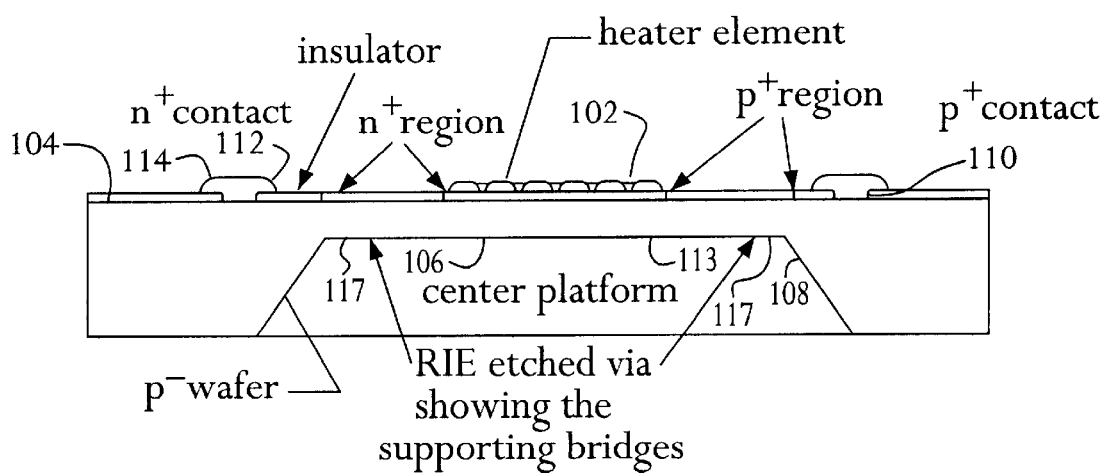
FIG. 2 provides a cross-sectional view of the sensor shown in FIG. 1.

FIG. 1 provides an exploded view of integrated temperature sensor device 10 in accordance with the present invention. FIG. 2 provides a sectional view of this same device. Integrated circuit sensor device 10 comprises diode component 100 and heater 102 with electrical insulating layer 104 between the two. Generally, heater 102 is employed to provide a fixed amount of heat energy to diode 100. As a consequence, the temperature of diode 100 is raised to a predetermined level. Thereafter, if there is a change to the environment of the diode 100, such as a change in the gases in the environment or the rate of flow of gases in the environment, a change in temperature corresponding to the removal of heat from the environment that is caused by the change in the environment is measured in diode 100 as reflected by a change in voltage across the diode's p-n junction. Thus, device 10 operates as an environment temperature change sensor. Furthermore, as is explained in greater detail below, device 10 also has applications related to gas detectors, pressure sensors, and gas flow sensors.

As shown in FIG. 1, diode 100 and heater element 102 have positioned therebetween electrical insulating layer 104 which electrically insulates the two components. Diode 100 comprises a $n^+$ silicon region 106 and a $p^+$ region 108. Heater component 102 comprises a resistive material such as NiCr or Pd which generates heat energy when an electric current is applied thereto. Electrically insulating layer 104 may be composed of $Si_3N_4$ or a similar electrically insulating material. P contact hole 110 is formed in insulating layer 104 to provide electrical communication with the $p^+$ region of diode 100, and N contact hole 112 is formed in insulating layer 104 to provide electrical communication with $n^+$ silicon region 106 of diode 100. Contact regions 114 are located over p contact hole 110, n contact hole 112, and the terminal ends of heater 102 to provide regions for making electrical contact with heater 102 and diode 100. Contacts 1 14 may be manufactured from any one of several different conducting materials including gold or silver.

In the embodiment of FIG. 1, a junction between n+region 106 and $p^+$ region 108 occurs in central area 113. Active area 113 has bridge sections 117 extending therefrom connecting central active area 113 to extended areas of the silicon wafer. As shown, $n^+$ region and $p^+$ region extend across bridge sections 117. N contact hole 112 and p contact hole 110 correspond to regions of diode 100 located across bridge sections 117 from central area 113. In the embodiment of FIG. 1, central area 113 of sensor 10 is about 260×260 $\mu$m by 7 $\mu$m thick, and the resistor lines 115 of heater 102 are about 15 $\mu$m wide.

Figure 3:
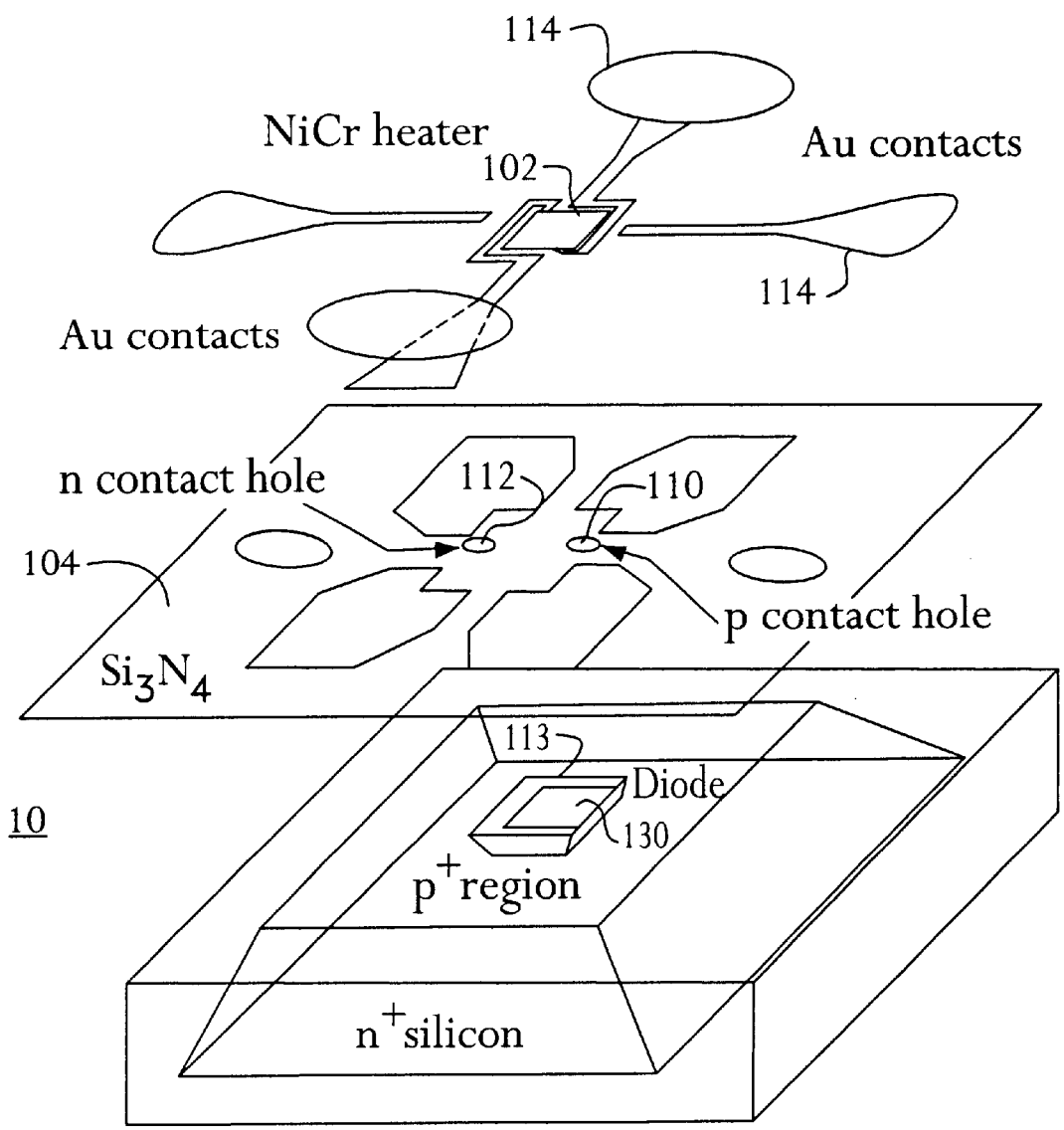
FIG. 3 is a schematic of an exploded view of an alternate embodiment of a sensor device in accordance with the present invention.

It should be noted that $n^+$ region 106 is manufactured from silicon which happens to conduct thermal energy. As a consequence, heat energy in central area 113 of diode 100 can be transferred through bridge sections 117 to extended portions of the wafer and any substrate to which it may be attached. Any loss of energy through the silicon to the substrate is undesirable as it adds inefficiencies to the sensor. Accordingly, to remedy the loss of thermal energy resulting from transmission of heat energy through the silicon, the inventors have developed alternative embodiments of the inventive sensor device such as that shown in FIG. 3. As shown, diode 130 is smaller than diode 100 of FIG. 1 and is thermally isolated from extended areas of silicon through which heat may be lost. Central area 113 comprises $n^+$ region and $p^+$ region, however, unlike device 10 of FIG. 1, there are no bridge sections 117 in device 10 of FIG. 3. Furthermore, because diode 130 is miniaturized, less thermal energy is required to affect diode 130. Consequently, the sensor device of FIG. 3 provides greater thermal sensitivity. It should be noted that due to the miniaturization of diode 130, n contact hole 112 and p contact hole 110 have been moved inward toward the center of insulating layer 104. Further, contacts 114 which correspond to n contact hole 112 and p contact hole 110 have been elongated to compensate for the placement of the contact holes.

Figure 4:
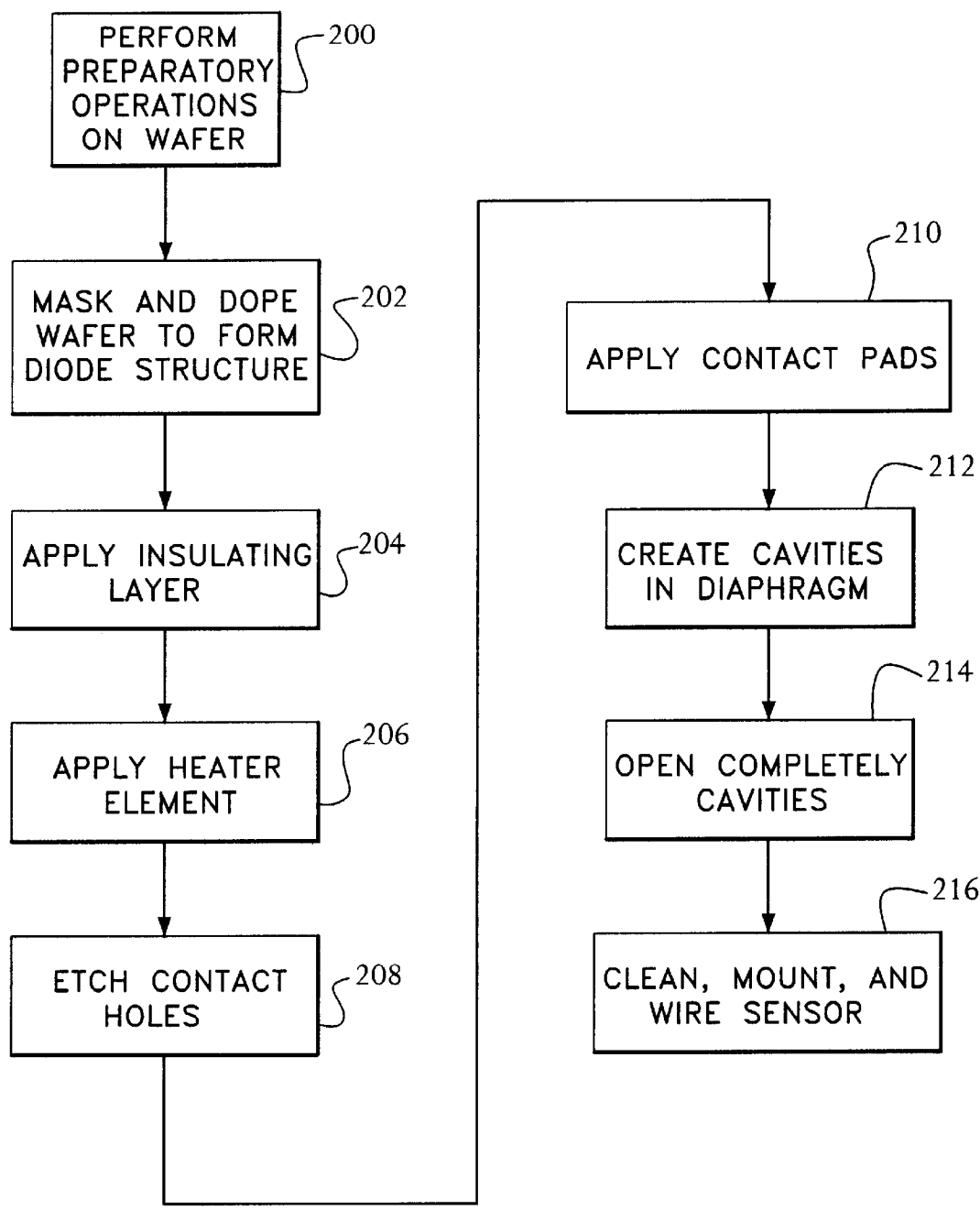
FIG. 4 provides a flow chart of a method for manufacturing a sensor device such as that shown in FIGS. 1 and 2.

FIG. 4 provides a flow chart of a method for manufacturing a sensor device such as that shown in FIGS. 1 and 2. One skilled in the art will acknowledge that the method of FIG. 4 can be readily modified to manufacture the sensor of FIG. 3. As shown, at step 200 preliminary preparations are made to a silicon wafer. Step 200 may include cleaning a double sided p-doped (10Ω.cm) Si[100] wafer using standard RCA procedures and oxidizing the silicon wafer in a wet $O_2$ atmosphere to obtain a mask oxide of about 1 $\mu$m thick. After patterning the back side and defining the openings in the mask oxide with buffered hydrofloric (BHF) acid etch, the wafer is anisotropic etched (KOH: $H_2O$/4:10/52° C.) for 20 hours in accordance with the techniques described by Seidel et al. in an article entitled "Anisotropic Etching of Crystalline Silicon in Alkaline Solution," *J. Electrochein. Soc.*, Vol. 137, No. 11, pp. 3612–3626 (1990). The membranes obtained with this process may be in the range of 30 $\mu$m thick.

The wafer is masked and doped at step 202 to form diode 100. After stripping the remaining oxide and performing a standard clean, another mask oxidation (~1 $\mu$m thick) is applied to avoid doping the back regions of the wafer during successive operations. Windows are patterned in the front side oxide and a $p^+$ doping is performed using spin-on boron glass. The doped layer is driven-in under an oxygen ambient to form a 50 W/sq $p^+$ layer. A further photolithographic step patterns windows for an $n^+$ doping with phosphorous spin-on dopant. The resulting diode structures, tested using a HP4145B Parameter Analyzer, show a 850W series resistance in forward bias and ~1 $\mu$A dark current at 60V in reverse bias.

At step 204 wafer insulating layer 104 is applied to passivate and electrically isolate diode 100. The electrical insulation and passivation of the diode structure is made with a 300 nm layer of $Si_3N_4$ deposited by LPCVD (Low Pressure Chemical Vapor Deposition) at 850° C.

At step 206 heater 102 is applied to device 10. Heater 102 may be composed of most any resistive material including but not limited to NiCr or Pd. In an embodiment where Pd is employed, immediately after the removal from the LPCVD chamber, the wafers are loaded in an e-beam evaporator for the deposition of a 100 nm Pd (99.99%) layer. The deposition is performed at room temperature, with a base pressure of $4\times10^{-6}$ mbar and monitored using a quartz micro-balance. The patterning of the Pd layer is performed chemically with Pd etchant ($FeCl_3$: HCl/3:1/Transene Inc.) using positive resist (Shipley Microposit 1400–27). The resistors obtained present a resistance of about 120 $\Omega$. A similar process may be employed when NiCr is employed.

At step 208 contact holes 110 and 112 are etched in the $Si_3N_4$ insulating layer. In order to allow the electrical contacts with the diode through the nitride layer, $SF_6$ plasma etching (200 W/1.8 sccm $SF_6$ /270 mTorr) with a mask of 1.35 $\mu$m thick negative resist (Waycoat HNR120) is used and monitored with an alpha step until the desired depth is achieved.

At step 210 contact pads 114 are deposited. Contact pads 114 for both diode 100 and resistor 102 are made by depositing a 600 nm Au layer with e-beam evaporation. The deposition is performed at room temperature and at a base pressure of $5\times10^{-7}$ mbar. The process may be monitored using a quartz micro-balance. The gold layer is patterned using positive resist (Shipley Microposit 1400–27) and etched chemically with an iodine etch solution as described by Vossen et al. in the text entitled "Thin Film Processes," (Academic Press, New York, 1978).

At the conclusion of step 210, the electrical components of the sensor device 10 are substantially complete. Further processing may be exercised, however, to improve the thermal characteristics of the sensor device 10. Thus, at step 212 the wafer is cleaned and patterned using a 1.35 $\mu$m thick layer of negative resist (Waycoat HNR-120) to define the front side cavities on the diaphragm. The cavities are made using plasma etch with $SF_6$ (200 W/1.8 sccm $SF_6$/270 mTorr) and monitored with an alpha step to measure the depth of the openings in the Si and the reduction of the thickness of the resist protective layer. In order to obtain a 8.4 $\mu$m deep cavity in the Si diaphragm, the process of resist deposit and patterning may be repeated. The depth is very important in the definition of the final thickness of the device. After the desired depth is reached, another layer of negative resist is applied over the surface of the sensor as a protective layer during the diamond dicing of the wafer. The dicing may be performed with sample sizes of 4×4 mm.

At step 214 the devices are etched in the back side with $SF_6$ plasma etch (200 W/1.8 sccm $SF_6$/270 mTorr), to open completely the cavities previously etched in the front side. This step is monitored to avoid over-etch of the structures. After this step in the process, the thickness of the active area of the sensor and the beams is of the order of 8 $\mu$m.

At step 216 the sensor wafer is cleaned, mounted, and wired. The sensor is mounted in side-brazed chip carriers using silver epoxy (EPO-TEK H20E) to hold the device into a bay. The wiring may be made manually by attaching 100 $\mu$m thick gold wires to the sensor and to the chip carrier using silver epoxy. Silver epoxy may be preferable to wire bonding due to the poor adhesion of the gold pads to the $Si_3N_4$ film.

A sensor device such as that shown in FIG. 1 and manufactured according to the process described with reference to FIG. 4 is operable to measure temperatures and variations in temperatures in the ambient environment. For example, since temperature variations are directly proportional to variations in thermal conductivity of materials, a device in accordance with the present invention may be employed to measure the thermal conductivity of gases. Furthermore, where the gases involved are known, it is possible to approximate the relative concentration of mixed gases using thermal conductivity measurements.

Figure 5A:
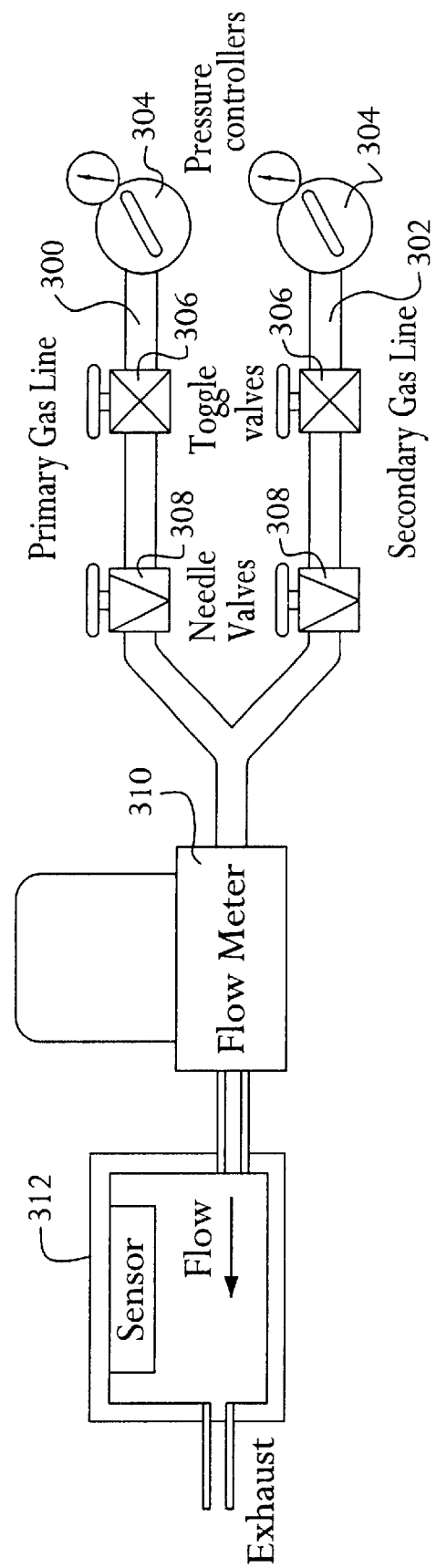
FIG. 5A is schematic of a system for testing the operability of a sensor to detect gas conductivity.
Figure 5B:
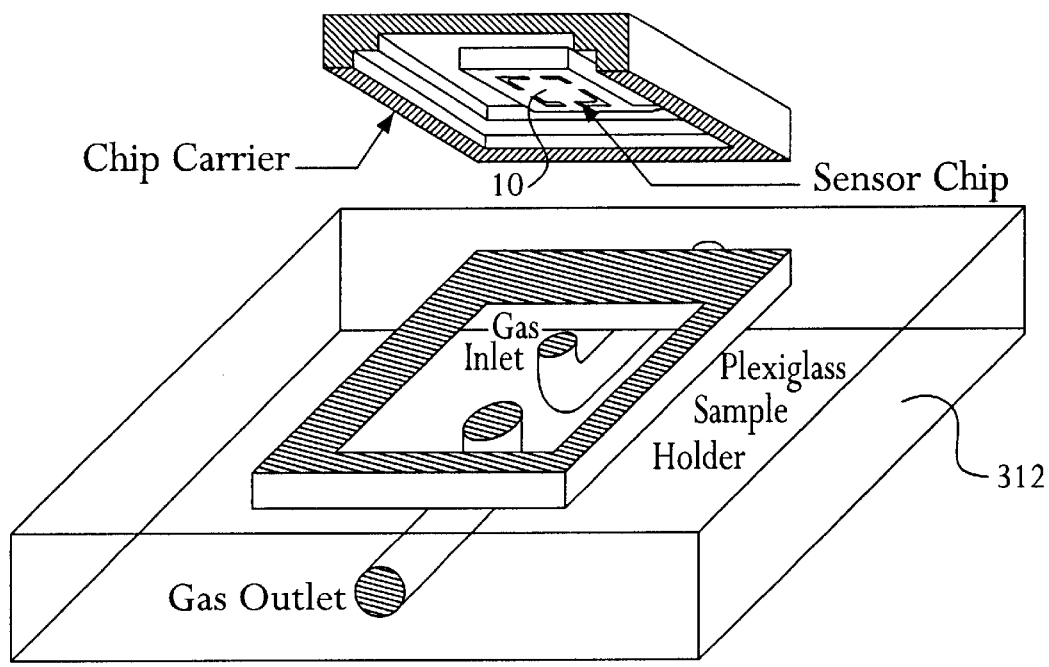
FIG. 5B is an enlarged view of the sealed chamber of FIG. 5A.

A system for testing the usefulness of a device in accordance with the present invention to provide conductivity estimates for gases is shown in FIG. 5A. The test system comprises a primary gas line 300 and a secondary gas line 302. Pressure regulator 304 is provided on each of gas line 300 and 302 to adjust the pressure of the gases in the system. Furthermore, each of gas line 300 and 302 is fitted with toggle valve 306 for switching gases flowing in the line and needle valve 308 for adjusting the flow of gases. Both lines 300 and 302 flow into flow meter 310 which is used to adjust each gas' flow. Flow meter 310 may be, for example, a rotameter Brooks R-2-15-D. Gas flow out of flow meter 310 is directed to sealed chamber 312 where sensor device 10 is exposed to the gas flow. FIG. 5B provides an enlarged view of the sealed chamber 312. The system of FIG. 5A may be employed for testing the operability of a sensor device 10 in accordance with the present invention to measure thermal conductivity for both pure and mixed gases.

1. Measurement of Thermal Conductivity of Pure Gases

Generally, testing in the system of FIG. 5A involves applying a constant voltage to heater 102 in order to heat the active area of sensor device 10 and to simultaneously apply a forward bias constant current to diode 102 so the voltage measured on its terminals is directly proportional to the absolute temperature of the active area. A steady flow of gas, $N_2$, is then introduced into the system to flush the system and provide a reference measurement. Thereafter, the $N_2$ flow is shut off and the flow of a test gas turned on while measurements continue to be taken. When it is desired to take measurements for a new gas, the initial test gas is turned off and a flow of $N_2$ is introduced to flush the system prior to introducing the new test gas.

In one test scenario, measurements were performed using 200 sccm of $N_2$ as the reference gas. The direct constant current applied to diode 100 was 3.7 $\mu$A and the voltage applied to heating resistor 102 was 5Vdc. With these values for the input parameters, the absolute temperature in the sensor was about 332 K in the beginning of each group of measurements. The test gas flow rate was also adjusted to 200 sccm to minimize the effects of the difference in the forced convective heat dissipation. The data was taken repeatedly in groups of five for each test gas with a rate of 20 measurements per second. For each repetition of the measurement, the test gas was switched again to the reference gas allowing the system to return to an initial condition.

Figure 6A:
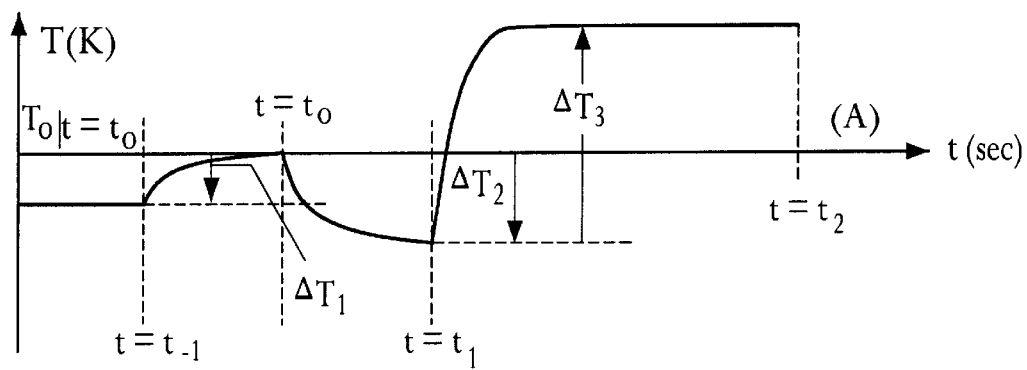
FIG. 6A is graph of the expected temperature plotted as a function of time for gases with thermal conductivity lower than a reference gas.
Figure 6B:
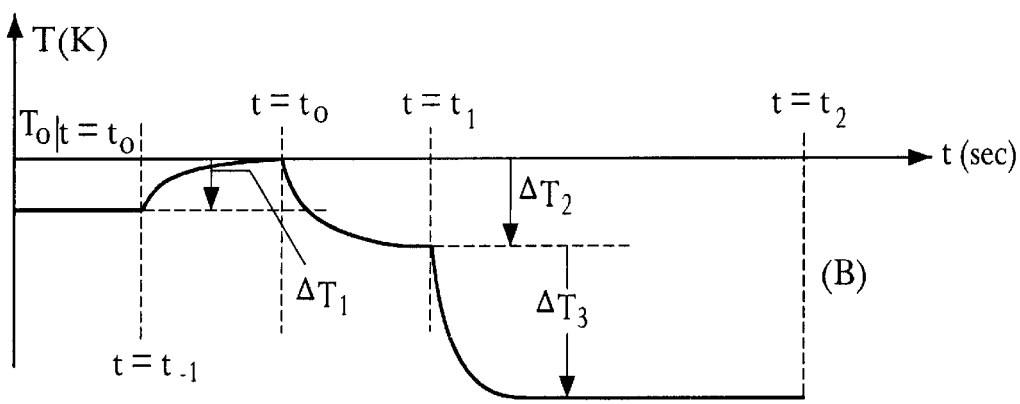
FIG. 6B is a graph of the expected temperature plotted as a function of time for gases with thermal conductivity higher than a reference gas.

FIGS. 6A and 6B provide graphs for the above described test scenarios of the expected behavior of the gas temperature as measured by sensor 10 as a function of time. FIG. 6A corresponds to the expected behavior for gases with thermal conductivity lower than the reference gas. FIG. 6B corresponds to gases with thermal conductivity higher than the reference gas. Initially the system is flushed with a steady flow of $N_2$, which is removed at $t=t_{-1}$. This action promotes a temperature increase ($\Delta T_1$) in the sensor caused by the elimination of the forced convective heat dissipation. After the temperature stabilizes, the test gas is turned on at $t=t_0$. In response, the temperature in the sensor falls ($\Delta T_2$) due to the increase of the flow and its associated forced convection. The time lag between $t=t_0$ and $t<t_1$ is defined by the length of the tubing between the valve and the sensor as well as the flow rate. During this interval the gas that is flowing through the sensor is $N_2$. At $t=t_1$ the test gas reaches the sensor and triggers another temperature change ($\Delta T_3$) related to the thermal characteristics of the test gas.

As reflected in FIG. 6A, when the thermal conductivity of the test gas is lower than the thermal conductivity of the reference gas, the sensor measures a temperature increase ($\Delta T_3>0$) due to the reduction of the conductive heat loss. In contrast and as reflected in FIG. 6B, when the thermal conductivity of the test gas is higher than the thermal conductivity of the reference gas, the sensor measures a temperature decrease ($\Delta T_3<0$) due to the increase of the conductive heat loss.

Figure 7:
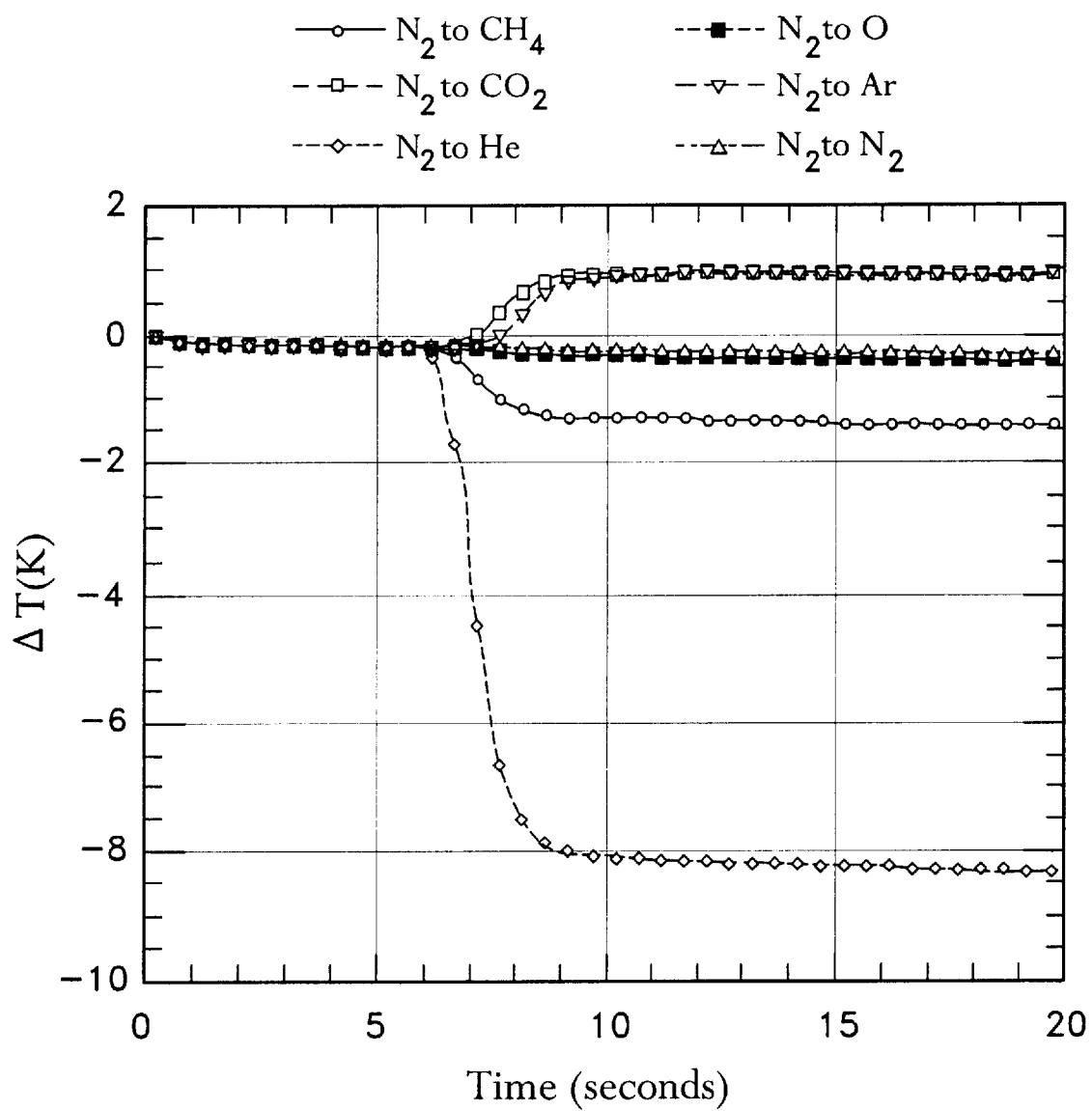
FIG. 7 is a graph illustrating a sensor's response to the switching from a reference gas to test gases.

FIG. 7 is a graph of actual temperature measurements taken by the sensor during the switch from the reference gas, $N_2$, to a test gas. As expected, for gases with thermal conductivity greater than $N_2$, such as $O_2$, $CH_4$ and He, the sensor device 10 shows a temperature reduction which can be explained by the increase of the conductive heat loss through the gas. For gases with lower thermal conductivity than $N_2$, such as Ar, and $CO_2$, the effect observed in the sensor is a temperature increase which can be associated with reduction of the heat dissipation due to decreased conductivity in the gas.

2. Measurement of Thermal Conductivity of Mixed Gases

The measurement procedure for mixed gases is basically the same as the procedure used for pure gases. The dilutant gas was injected directly into the $N_2$ flow at $t=t_0$, at flow rates appropriate for generating the desired proportion. When this dilutant is injected, the residual $N_2$ flow increases, causing the sensor temperature to drop slightly from the increased forced convection ($\Delta T_2$). At $t=t_1$, the gas mixture reaches the sensor and produces another temperature change ($\Delta T_3$) as the thermal conductivity changes from pure $N_2$ to that of the mixture. The sign of $\Delta T_3$ follows the same thermal conductivity convention as with pure gases. The time interval between $t_0$ and $t_1$ is determined by the flow rate of the system and the length of the tubing. This enables the proportion of the test gas in the $N_2$ to be calculated. The measurements were performed using a flow of 200 sccm of $N_2$ as the main flow, and the same electrical parameters as for the pure gases. In general, the working absolute temperature of the sensor was somewhat higher in these runs, being ~338 K. Three different gases were mixed with $N_2$ at different flow rates, $CH_4$, He and Ar, allowing the analysis of different concentrations of each test gas.

Figure 8A:
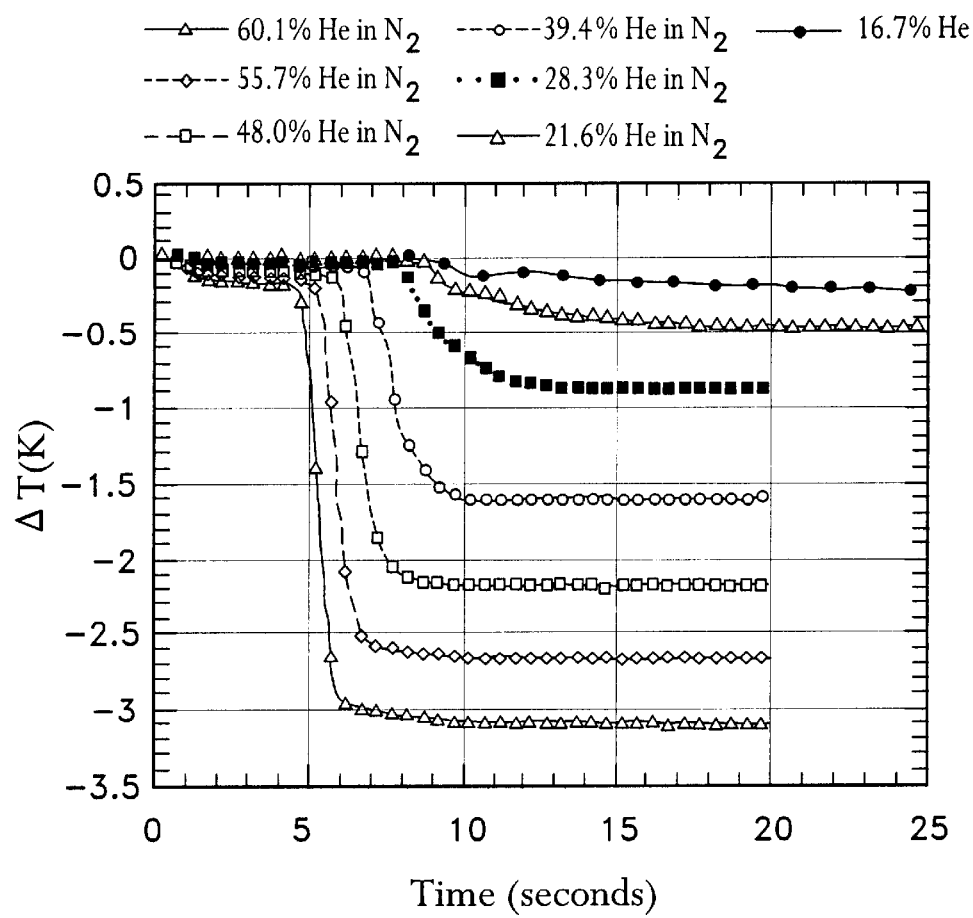
FIG. 8A is a graph of the sensor's response to the switching from a reference gas flow of $N_2$ to a mixture of $N_2$ and He.
Figure 8B:
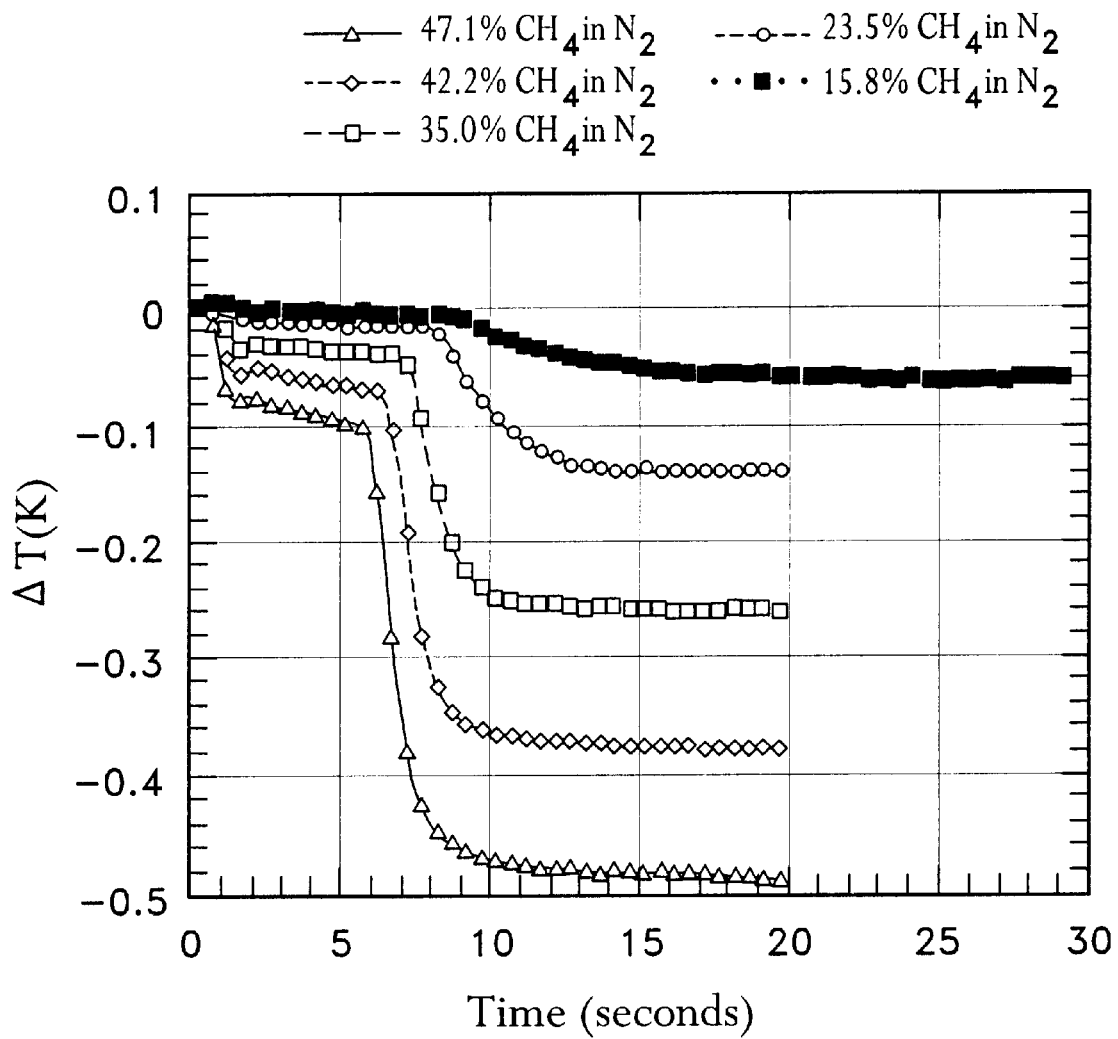
FIG. 8B is a graph of the sensor's response to the switching from a reference gas flow of $N_2$ to a mixture of $N_2$ and $CH_4$.
Figure 8C:
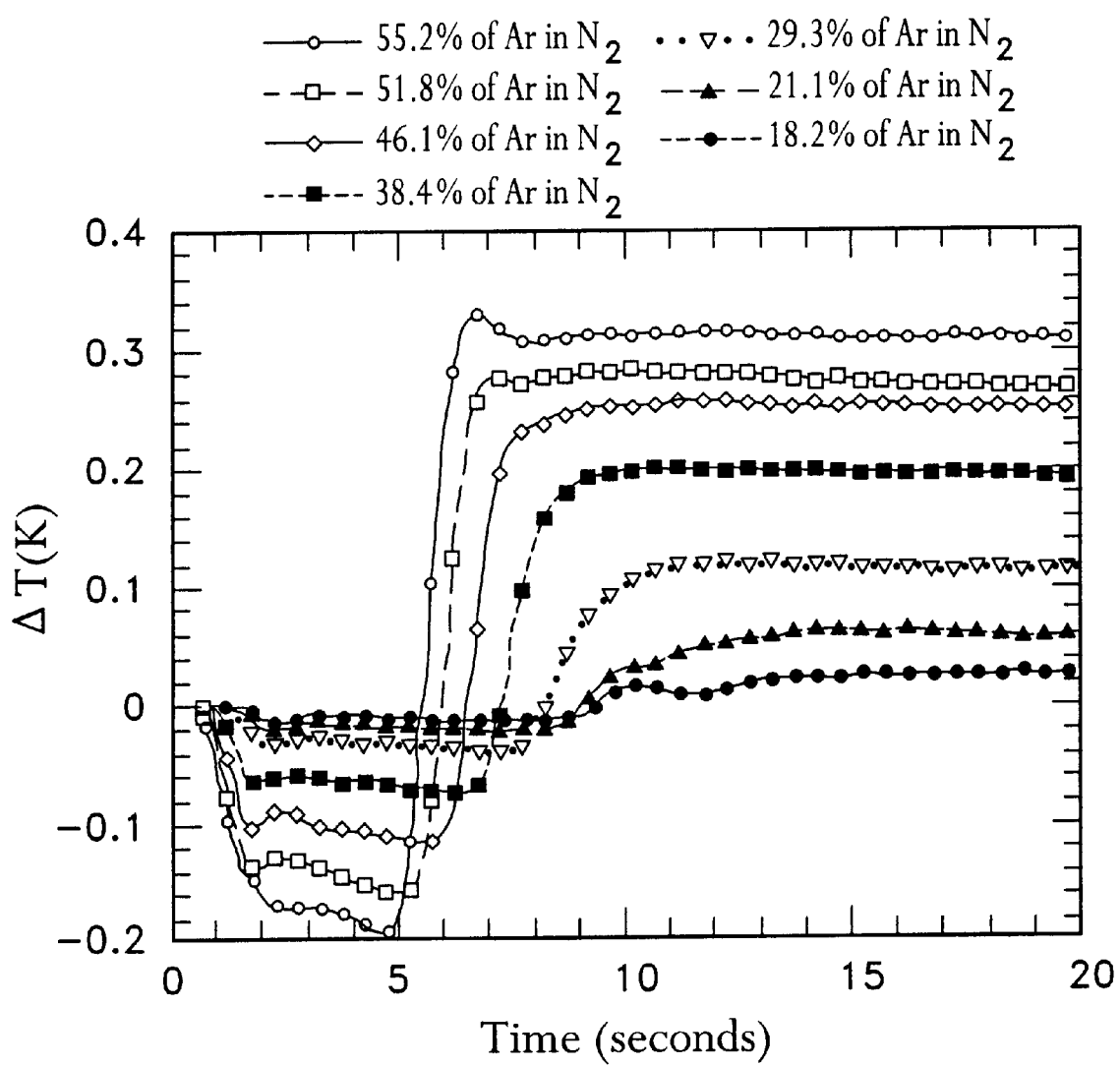
FIG. 8C is a graph of the sensor's response to the switching from a reference gas flow of $N_2$ to a mixture of $N_2$ and Ar.

As for the pure gases, the experimental behavior of the thermal probe shown in FIGS. 8A, 8B, and 8C agrees well with general expectations. It should be noted that for all the three gases, the slope of the curves as the test gas reaches the sensor is a function of the concentration. For smaller concentrations, i.e. smaller flow rates of the mixed flow, the slope of the curve is smaller than for higher concentrations when the flow rates are greater. Since the length of the tubing is fixed, the time of flight of the test gas is inversely proportional to the flow rate. This effect may be attributed to the interdiffusion of the test gas in the $N_2$ of the main flow.

3. Data Analysis Model

Figure 9:
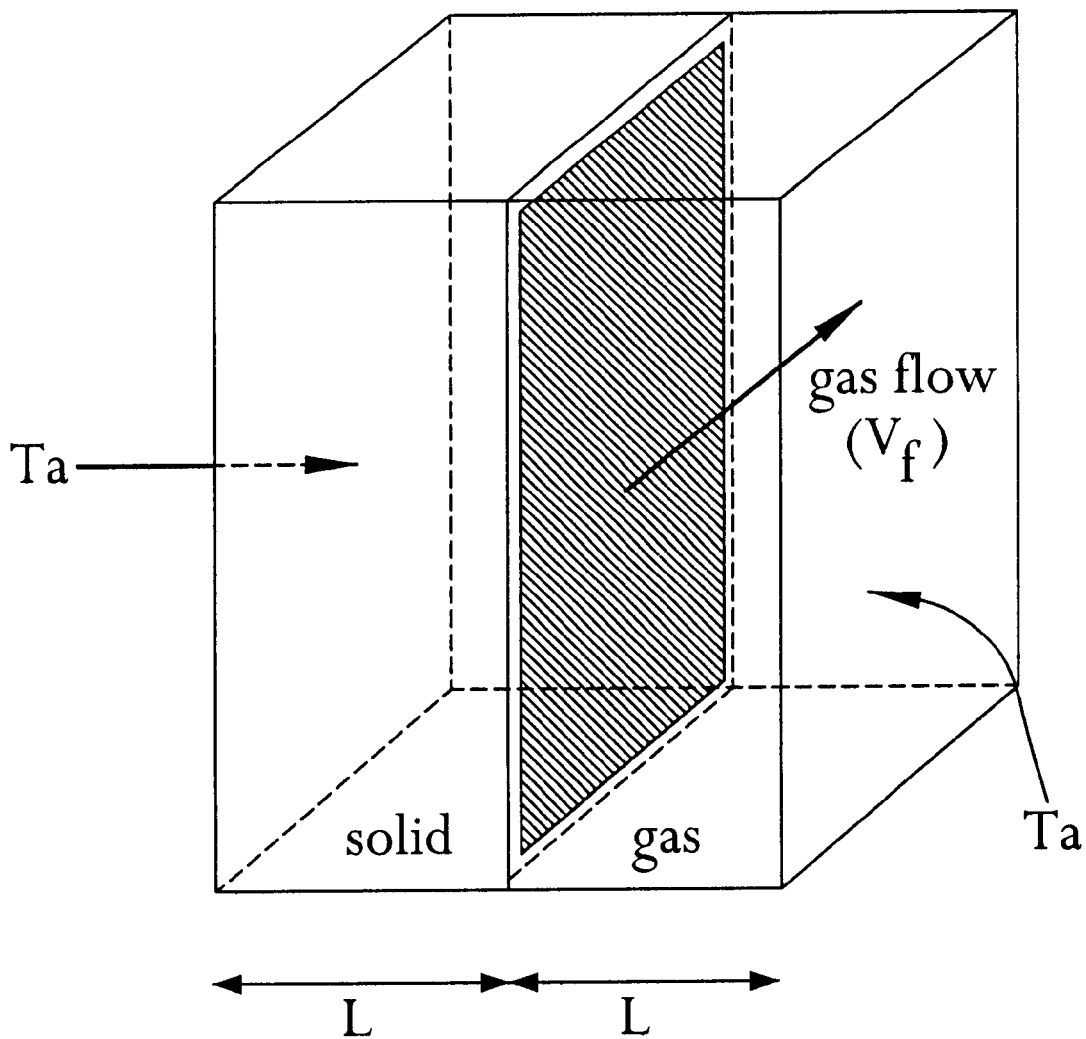
FIG. 9 illustrates the flow of a gas at a constant speed $v_f$ past a solid interface.

The data collected from the above described experiments may be analyzed as follows to provide support for the concept that a test sensor in accordance with the invention may be applied to identifying the thermal conductivity of gases. Suppose a hypothetical structure as shown in FIG. 9 comprises two different materials of the same volume where one is solid, as is sensor 10, and the other is a gas flowing at constant speed $v_f$. Both materials are in perfect thermal contact and at the interface there is a constant heat source. The other two walls of the composite are at room temperature (Ta). When the system reaches steady-state, the interface temperature reaches a stable value, $T_s$, which represents the temperature measured by the sensor device 10.

In this model, it is assumed that the structure is a unidimensional one and that there are only three heat loss contributions: the heat conduction through the solid, the heat conduction through the gas, and the forced convection due to the gas flow. Based on Fourier's law of heat conduction, the conductive heat loss can be written as:

$$\overset{''}{q}_{cond-solid} = \frac{k_{solid}}{L} * (T_S - Ta) \quad (2)$$

for the solid, and as $$\overset{''}{q}_{cond-gas} = \frac{k_{gas}}{L} * (T_S - Ta) \quad (3)$$

for the gas. For the convective heat loss it is necessary to assume that the thickness L and the flow speed are small enough to allow the complete heating of the gas from room temperature (Ta) to the temperature of the interface (Ts). The heat loss is calculated as the heat absorbed by a small gas volume and removed from the sensor chamber due to the flow, which can be written as:

$$q''_{conv\text{-}gas} = \rho * v_f * C_P * (T_S - Ta) \quad (4)$$

where $\rho$ and CP are the gas density and constant pressure specific heat, respectively. The total heat loss of the system is:

$$\overset{''}{q}_{Loss} = \left[\frac{1}{L} * (k_{solid} + k_{gas}) + \rho * v_f * C_P\right] * (T_S - Ta) \quad (5)$$

Energy conservation dictates that:

$$q''_{in} = q''_{Loss} \quad (6)$$

Therefore, the temperature of the interface can be calculated as:

$$T_S = \frac{\overset{''}{q}_{in} * L}{[k_{solid} + k_{gas} + L * \rho * v_f * C_P]} + Ta \quad (7)$$

If the gas that flows through the system is switched to a different gas, and the system is allowed to again reach steady-state, the interface temperature will change depending on the thermal characteristics of the new gas. It is assumed that the change in the gas that is flowing through the system does not change the thermal conductivity of the solid. Therefore, the temperature variation can be calculated as:

$$\Delta T = T_{S2} - T_{S1} \quad (8)$$

which can be written as:

$$\Delta T = \frac{\ddot{q}_{in} * L * [(k_{gas1} - k_{gas2}) + L *}{[K_{solid} + k_{gas2} + L * \rho_2 * v_{f2} * C_{P2}] *} \quad (9)$$
$$\frac{(\rho_1 * v_{f1} * C_{P1} - \rho_2 * V_{f2} * C_{P2})]}{[k_{solid} + k_{gas1} + L * \rho_1 * v_{f1} * C_{P1}]}$$

Since the thermal conductivity of the solid, $k_{solid}$, is at least three orders of magnitude greater than the thermal conductivity of the gas, $k_{gas}$, and is at least two orders of magnitude greater than the factor $L*\rho*v_f*C_p$, the equation can be written as:

$$\Delta T \approx \frac{\ddot{q}_{in} * L}{K_{solid}^2} * [(k_{gas1} - k_{gas2}) + \quad (10)$$
$$L * (\rho_1 * v_{f1} * C_{P1} - \rho_2 * v_{f2} * C_{P2})]$$

Comparing the two remaining terms in the square bracket, it is found that for the experiments described above the thermal conductivity variation is between one and two orders of magnitude greater than the variation in convective heat loss. This equation can be re-written in a simpler manner so as to depend only on the variation of the thermal conductivity of the gases $$\Delta T \approx \frac{\ddot{q}_{in} * L}{k_{solid}^2} * (k_{gas1} - k_{gas2}) \quad (11)$$

This equation indicates that the temperature difference should vary linearly with the change in gas thermal conductivity, relative to the reference $N_2$. Thus, the following equation fits the data obtained in the experiments:

$$\Delta T \approx \alpha^*(k_{ref} - k_{test}) \quad (12)$$

where $k_{ref}$ is the thermal conductivity of the reference gas, N2, and $k_{test}$ is the thermal conductivity of the pure test gas. The test gas may be a pure gas ($CH_4$, He, or Ar, thermal conductivity=$k_{pure}$) or a mixture in which case, $k_{test}$ is a series combination of thermal resistivities of the form:

$$k_{test} = \frac{1}{\left[\frac{x}{k_{pure}} + \frac{(1-x)}{k_{ref}}\right]} \quad (13)$$

where x is the proportion of the pure gas mixed with the reference gas. Equation (12) and (13) suggest that α is relatively independent of gas selection.

As previously noted, it is particularly desirable to define the relation between the temperature variation measured in the sensor as a function of the thermal conductivity variation. Accordingly, the data in FIGS. 7 and 8 were analyzed to extract the temperature, T, induced as the different gases flowed over the sensor device 10. With the help of Equation 11, the parameter α can be extracted and examined for these different gases and compositions. A summary of this analysis is presented in Table 1 including the slope parameter, α, its standard deviation, the intercept of the linear regression, β, the standard deviation of the intercept, and the linear regression fitting quality parameter, $R^2$, for the different mixed and pure gases.

TABLE 1

| Data Set | α | Std α | β | Std β | $R^2$ | Observation |
|---|---|---|---|---|---|---|
| Ar in $N_2$ (18.2 → 55.2%) | 134 | 5.96 | −0.247 | 0.019 | 0.990 | — |
| He in $N_2$ (16.7 → 60.1%) | 124 | 5.75 | 0.196 | 0.117 | 0.989 | — |
| $CH_4$ in $N_2$ (15.8 → 47.1%) | 142 | 8.32 | 0.097 | 0.016 | 0.989 | — |
| Pure Gases | 140 | 6.13 | −0.044 | 0.087 | 0.996 | excluding pure He |
| All data | 114 | 3.54 | −0.029 | 0.153 | 0.980 | excluding pure He |

As can be seen in Equation 11, α depends on the heat in, $q''_{in}$, the thermal conductivity of the silicon, $k_{solid}$, and the parameter L defined earlier as the thickness of the gas layer that is flowing near the sensor. Since it is desired to determine the relation between the temperature variation measured in the sensor as a function of the gas thermal conductivity variation, in FIG. 10 the values of $\Delta T_3$ are plotted against the values for Δk=(kafkest), as in equation (12), for both pure and mixed gases. $\Delta T_3$ is used because of its weak dependence on the flow rate.

Figure 10:
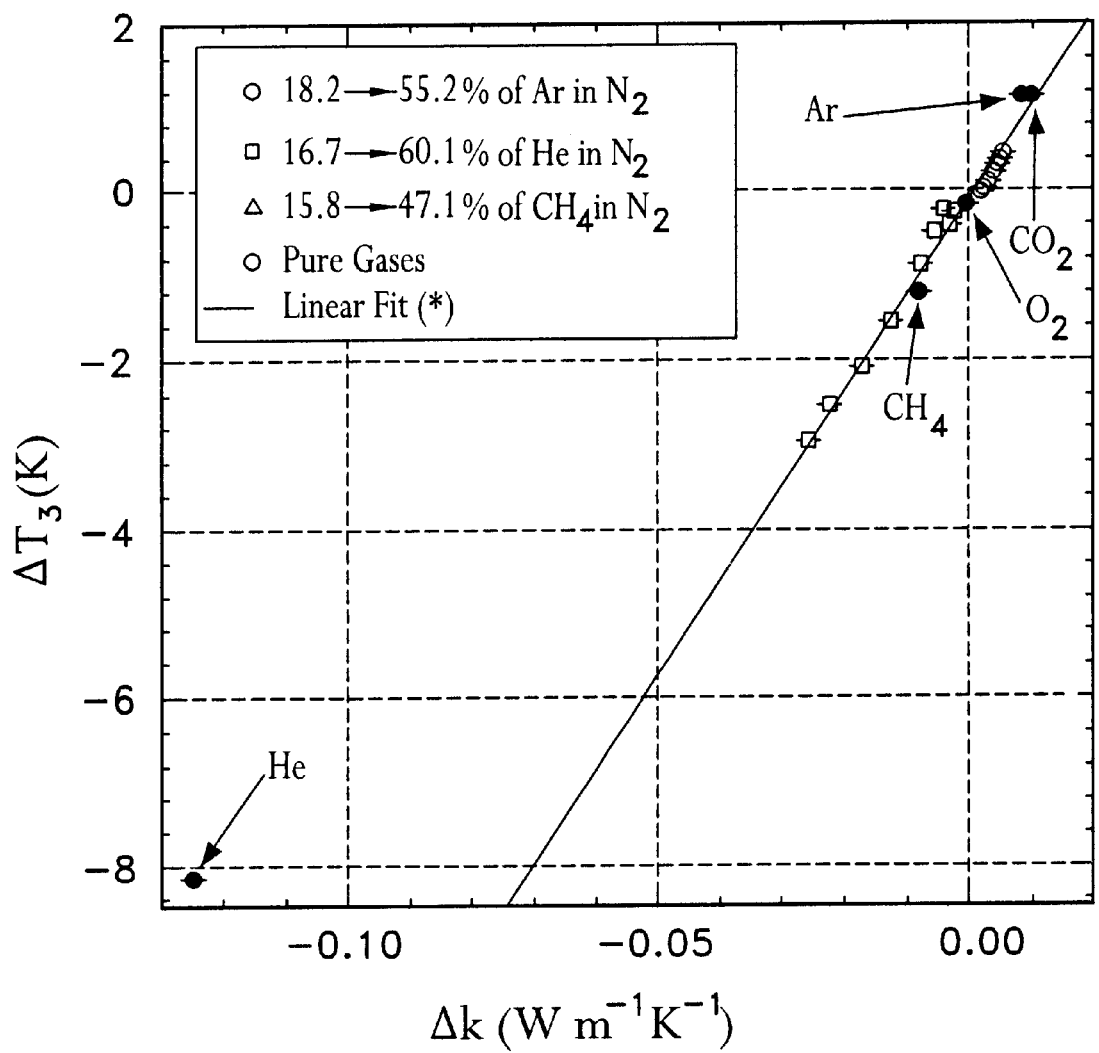
FIG. 10 is a graph of temperature variation as a function of thermal conductivity.

The linear distribution of the data in FIG. 10 indicates a satisfactory agreement with the proposed analytical model for both pure and mixed gases. The linear regressions showed some differences in α* for each set of data but this can be attributed to small variations in the power applied to the heating resistor 102 and the effects of the forced convection, quantities ignored in the model for simplicity. The deviation of the pure He values from linear behavior can be attributed to the marked difference in thermal properties of this gas compared to the reference $N_2$. When He is mixed with $N_2$, the difference is reduced and the data agrees better with the model.

Thus, the data collected by experiment confirms that a temperature sensing device in accordance with the present invention is operable to detect thermal conductivity and the relative distributions of known gases. Based on this conclusion, it has been observed by Gajda et al. in an article entitled "Applications of Thermal Silicon Sensors on Membranes," Sensors and Actuators-A, Vol. 49, pp. 1–9 (1995) that a sensor device 10 such as that in accordance with the present invention has unlimited applications as a gas detector, pressure sensor, and/or gas flow sensor.

Although embodiments of the invention have been described in detail above, those skilled in the art will appreciate that numerous other modifications to the invention are possible within the scope of the invention. For example, the diode may have numerous configurations and sizes. Further various different materials may be used for the heater and insulating layer. Accordingly, the scope of the invention is not intended to be limited to the preferred embodiments described above, but only by the appended claims.

We claim:

1. A method of analyzing gas flow, comprising:
   providing a sensor for measuring changes in environment temperature, the sensor comprising:
      a heater element for creating a fixed quantity of heat energy, and
      an integrated circuit diode comprising a first electrical contact and a second electrical contact, wherein said integrated circuit diode is electrically isolated from the heater element and receives said fixed quantity of heat energy from the heater element, and changes in temperature are reflected as a change in voltage across said first electrical contact and said second electrical contact, said sensor having a known ratio of the change in temperature measured by the sensor in response to exposing the sensor to at least a first gas having a first thermal conductivity and a second gas having second thermal conductivity to the difference between the first thermal conductivity and the second thermal conductivity;

exposing the sensor to a reference gas flow and measuring the temperature as indicated by the voltage across the diode;

exposing the sensor to a test gas flow and measuring the temperature of the sensor as indicated by the voltage across the diode;

calculating the temperature change between the reference gas flow and the test gas flow; and calculating the thermal conductivity of the test gas using the ratio, the temperature change from the reference gas flow to the test gas flow, and the thermal conductivity of the reference gas.

2. The method of claim 1, wherein the step of determining a ratio comprises:

exposing the sensor to a first gas flow of a gas with a known thermal conductivity;

taking a first temperature measurement of the sensor associated with the first gas flow;

exposing the sensor to a second gas flow of a gas with a known thermal conductivity;

taking a second temperature measurement of the sensor associated with the second gas flow;

calculating the ratio of the difference between the first temperature measurement and the second temperature measurement to the difference between the first thermal conductivity and the second thermal conductivity.

3. The method of claim 1, wherein the step of determining a ratio comprises:

taking a plurality of temperature measurement readings from the sensor for gas flows having known thermal conductivities; and calculating the slope of a line created by plotting the temperatures as a function of the known thermal conductivities.

4. The method of claim 1, wherein the step of calculating the thermal conductivity of the test gas flow comprises solving the equation $k(test)=k(ref)-(\Delta T/\alpha)$, for $k(test)$, wherein $\Delta T$ is the temperature change at the sensor from the reference gas flow to the test gas flow, $k(ref)$ is the thermal conductivity of the reference gas flow, and $\alpha$ is the ratio.

5. The method of claim 1, wherein the reference gas flow comprises a flow of a first reference gas, the test gas flow comprises a flow of the first reference gas combined with a second pure gas, said method further comprising determining the proportion of the pure gas in the test gas flow.

6. The method of claim 5, wherein the step of determining the proportion of pure gas in the test gas flow comprises solving the equation $k(test)=1/((x/k(pure))+(1-x)/k(ref)))$, for x, wherein $k(ref)$ represents the thermal conductivity of the first reference gas, $k([test]pure)$ represents the thermal conductivity of the second pure gas, and $k(test)$ represents the thermal conductivity of the combined second pure gas in the first reference gas.

7. The method of claim 1, wherein said integrated circuit diode further comprises an n+ region and a p+ region.

8. The method of claim 1, wherein said heater element further comprises at least one of NiCr and Pd.

9. The method of claim 1, wherein sensor further comprises an insulating layer positioned substantially between said heater element and said integrated circuit diode for electrically insulating said heater element from said integrated circuit diode.

* * * * *

UNITED STATES PATENT AND TRADEMARK OFFICE
CERTIFICATE OF CORRECTION

PATENT NO.    : 6,290,388 B1
DATED         : September 18, 2001
INVENTOR(S)   : Cyro K. Saul and Jay N. Zemel It is certified that error appears in the above-identified patent and that said Letters Patent is hereby corrected as shown below:

Column 9,
Line 28, insert -- as: -- after the word "gases"

Column 10,
Line 22, delete "(kafkest)" and insert therefor -- $(K_{ref}-K_{test})$ --

Column 12,
Line 23, delete "[test]" after "k"

Signed and Sealed this

Thirtieth Day of April, 2002

Attest:

JAMES E. ROGAN
*Director of the United States Patent and Trademark Office*

*Attesting Officer*